United States Patent Office 3,454,538
Patented July 8, 1969

3,454,538
POLYMERIZATION OF OLEFINICALLY UNSATURATED COMPOUNDS USING π-OLEFIN COMPLEXES AS POLYMERIZATION INITIATORS
Herbert Naarmann, Ludwigshafen (Rhine), Hermann Pankraz Hofmann, Frankenthal, Pfalz, and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed Feb 16, 1965, Ser. No. 433,165
Claims priority, application Germany, Feb. 28, 1964, B 75,639
Int. Cl. C08f 1/52, 5/00
U.S. Cl. 260—78.5     9 Claims

---

ABSTRACT OF THE DISCLOSURE

Process for the production of homopolymers and copolymers of ethylenically unsaturated monomeric compounds using as the catalyst π-olefin complexes of metals selected from Groups I-B, V-B, VI-B, and VII-B and elements of atomic numbers 27 to 78 of Group VIII of the Periodic System of Elements.

---

This invention relates to the polymerization of olefinically unsaturated compounds. More specifically, the invention concerns a process for the production of polymers of olefinically unsaturated compounds in which novel catalysts are employed.

It is known that unsaturated organic compounds will polymerize in the presence of certain organometallic catalysts according to an anionic or cationic reaction mechanism. Mainly the following groups of catalysts are suitable for this purpose: (1) organometallic compounds or alkali metals and (2) catalyst combinations consisting of a compound of a transition metal and an organometallic compound. Both types of catalyst have specific action and are suitable only for polymerizing specific types of monomer.

These catalysts are usually extremely sensitive to air and water and handling them is dangerous, for example because of spontaneous combustion in the air. Another disadvantage of the use of these catalysts is that it is necessary to subject the monomers to a costly purification prior to the polymerization.

It is an object of this invention to provide a process for the production of homopolymers and copolymers of ethylenically unsaturated monomeric polymerizable compounds with which it is unnecessary to subject the monomers to special purification. Another object of the invention is to provide a polymerization process involving the use of catalysts which do not ignite spontaneously. A further object of the invention is to provide particularly effective polymerization catalysts for use in the process.

These objects are achieved in accordance with this invention by carrying out the polymerization in the presence as catalyst of a metal π-complex of a metal of Groups I-B, V-B, VI-B or VII-B or of an element having an atomic number from 27 to 78 or Group VIII of the Periodic System (Handbook of Chemistry and Physics, 38th edition, pp. 394–395, Chemical Rubber Publishing Co., Cleveland, Ohio).

Examples of suitable ethylenically unsaturated compounds having polymerizable carbon-carbon double bonds which may be polymerized by the process according to the invention are α,β-unsaturated carboxylic acids, such as acrylic acid or methacrylic acid, esters of such acids, for example with alcohols having one to eight carbon atoms, such as methyl acrylate, ethyl acrylate, propyl acrylate, n-butyl acrylate or tert.-butyl acrylate and the corresponding esters of these alcohols with methacrylic acid. Furthermore nitriles or amides of these acids, such as acrylonitrile, methacrylonitrile, acrylamide or methacrylamide; vinyl esters, such as vinyl acetate or vinyl propionate; vinyl ethers, such as vinyl methyl ether or vinyl n-butyl ether; vinyl chloride; vinylidene chloride; vinyl ketones, such as methyl vinyl ketone or isopropyl vinyl ketone; and N-vinyl compounds, such as N-vinylpyrrolidone, N-vinylcaprolactam or N-vinylcarbazole, are suitable. Fumaric acid, maleic acid and their esters or maleic amide or their methylol compounds may also be used.

The process is particularly suitable for the production of homopolymers and copolymers of α-olefins having one or two double bonds. The α-olefins preferably contain two to ten carbon atoms. Examples are: ethylene, propylene, isobutylene, and also 1,3-dienes, such as butadiene-(1,3), isoprene, 2-phenylbutadiene-(1,3), and also styrene, α-methylstyrene, nuclear methylstyrene or nuclear halostyrene.

With the catalysts to be used according to this invention it is possible to copoylmerize olefins with other monomers which can only be polymerized incompletely or not at all by prior art methods. For example ethylene may be copolymerized with vinyl ethers, styrene with vinyl acetate, or propylene, butadiene-(1,3) or isoprene with acrylic acid.

Some of the polymers have a sterically arranged structure. For example polyethylene prepared by the process has a high crystalline fraction. The density is more than 0.95. Moreover polyacrylic acid, poly(methyl methacrylate) and polyvinyl pyrrolidone have a higher stereospecificity than the polymers prepared with free radical forming catalysts.

The metal π-complexes have the following general formulae: $(olefin)_m Me$, $(olefin)_m MeX_n$, $(olefin)_m X_n L_o$ and $(olefin)_m (aromatic)$. In these formulae the symbols have the following meanings:

Me.—an atom of a transition element of Groups I-B, V-B, VI-B or VII-B or the elements having atomic numbers from 27 to 78 of Group VIII of the periodic System;

X.—a monovalent, negatively charged radical, for example $Cl^-$, $NO_3^-$ $CH_3.COO^-$, $ClO_4^-$, $Br^-$ or $I^-$;

L.—neutral ligands, for example amines or phosphines; and $m$, $n$ and $o$: simple integers.

The olefins may contain one or more double bonds. Olefins having from one to four double bonds are particularly suitable. Linear or cyclic olefins are also suitable. Examples are: ethylene, propylene, butenes, butadiene, isoprene, pentadienes, and hexadiene; cyclobutene, cyclobutadiene, cyclopentadiene, cyclohexane, cyclohexadienes, cycloheptadienes, cycloheptatrienes, cyclooctadiene, cyclooctatriene, cyclooctatetraene and cyclododecatriene.

The aromatics may be benzene and its derivatives, for example toluene and mesitylene.

Examples of suitable metal π-complexes are allyl nickel bromide, bis-allyl nickel, silver (butadiene) nitrate, nickel bis-cyclooctadiene-1,3, silver (cyclohexadiene-1,3) nitrate, copper (cyclooctadiene-1,5) chloride, rhodium (cyclooctadiene-1,5) diacetate, ruthenium (cyclohexadiene-1,3) benzene (nickel (triphenyl phosphine)$_2$) ethylene, dicyclopentadienyl zinc, cyclopentadienyl mercury chloride, trimethylcyclopentadienyl aluminum, cyclopentadienyl thallium, dicyclopentadienyl titanium dichloride, dicyclopentadienyl tin, dicyclopentadienyl vanadium, dicyclopentadienyl vanadium iodide, dicyclopentadienyl chromium, dicyclopentadienyl molybdenum dibromide and monomethylcyclopentadienyl manganese benzene.

Metal π-complexes are compounds such as are described in the publications "Olefin, Acetylene and π-Allylic Complexes" by R. G. Guy and B. L. Shaw in Advances in Inorganic Chemistry and Radiochemistry, pages 78–126, vol, 4 (1962), "π-Complexes" by G. Wilkinson and F. A. Cotton in Progress in Inorganic Chemistry, pages 1–125, vol. 1 (1959) and, inter alia, in the monograph "Metall π-Komplexe mit di- und oligo-olefinischen Liganden" by E. O. Fischer and H. Wepper, Verlag Chemie G.m.b.H., Bergstrasse, Weinheim, 1963. They may be obtained for example by reaction of metal salts with olefins according to methods such as are described in the said publications.

The catalysts are used in amounts of from 0.001 to 5%, advantageously from 0.01 to 1%, by weight with reference to the compounds having polymerizable carbon-carbon bonds. The metal π-complexes are generally used alone, i.e. without mixing with other catalysts or catalyst components.

Catalytic activity of the metal π-complexes may sometimes be increased, however, by adding to them small amounts of organic, preferably aliphatic halogen compounds, such as chloroform, carbon tetrachloride and trichloroacetic acid, or organic amines, such as pyridine. It is advantageous to use 0.01 to 50 parts of these compounds to 1 part of metal π-complex.

Polymerization may be carried out at from 0° to +250° C., preferably from 20° to 150° C. Any pressure may be used.

Monomers may be homopolymerized or copolymerized in the block by the method according to the invention. Monomers may however be dissolved or suspended for the polymerization in inert auxiliary liquids. Examples of such auxiliary liquids are aliphatic, cycloaliphatic and aromatic hydrocarbons, such as n-pentane, n-hexane, isohexane, n-heptane, n-octane, isooctane, cyclohexane, methylcyclohexane, benzene, toluene, o-xylene, m-xylene, p-xylene, ethylbenzene, cumene, isopropylbenzene, tetrahydronaphthalene or decahydronaphthalene. Ethers, such as diethyl ether, dibutyl ether, tetrahydrofuran, dioxane, glycol dimethyl ether or glycol phenylmethyl ether are also suitable.

The catalysts are generally soluble in organic solvents and in the monomers. They are safe to handle with the usual precautions. It is a particular advantage that it is not necessary to use extremely pure monomers and auxiliary liquids when using the process according to the invention. Nor is the course of the polymerization disturbed by quite small amounts of water or air of the order of up to 100 p.p.m. which may be contained in the monomers or auxiliary liquids as impurities. Moreover it is possible to influence the steric structure of the polymers.

The invention is further illustrated by the following examples. The parts specified in the examples are parts by weight. K-values are determined by the method of H. Fikentscher in Cellulose-Chemie, vol. 13 (1932), 58.

Example 1

A mixture of 100 parts of butadiene and 0.1 part of nickel(o)-bis-cyclooctadiene-1,3 is heated at 100° C. in an autoclave for ten hours. During this period the pressure falls from an initial value of 12 atmospheres gauge to 2.3 atmospheres gauge. 88 parts of polybutadiene having a K-value of 89 is obtained. The polymer has 1.4-cis structure to the extent of about 45%. It is completely soluble in benzene and toluene. If the above procedure is repeated but using monomethylcyclopentadienyl manganese benzene as initiator, 63 parts of polymer is obtained which has a K-value of 93, which has 1,4-cis structure to the extent of 40% and which exhibits a narrow molecular weight distribution.

Example 2

A mixture of 100 parts of isoprene, 100 parts of benzene and 0.3 part of allyl nickel bromide is heated for ten hours at 125° C. in an autoclave. 85 parts of polyisoprene having a K-value of 67 is formed. The polymer has 1,4-cis structure to the extent of about 36%. It is completely soluble in toluene or styrene. By following the same procedure but using diallyl nickel, 52 parts of polymer having a K-value of 82 is obtained.

Example 3

A mixture of 30 parts of methyl methacrylate and 0.03 part of [nickel(P(C$_6$H$_5$)$_3$)$_2$]C$_2$H$_4$ is heated at 50° C. for thirty hours. A pale yellow solid polymer is formed. To purify it, the polymer is dissolved in benzene and precipitated with methanol. 20 parts of a polymer is obtained having a K-value of 82 and a glass temperature of 78° C. By following the same procedure but using dicyclopentadienyl molybdenum dibromide as initiator, 18 parts of a polymer is obtained which has a K-value of 80.5 and which is predominantly of syndiotactic structure.

Example 4

A mixture of 30 parts of styrene, 0.03 part of silver (cyclooctadiene-1,5) nitrate and 0.005 part of pyridine is heated for twenty-four hours at 50° C. Three times the amount of methanol is added to the highly viscous reaction solution and the polymer which is thus precipitated is isolated. 17 parts of polystyrene having a K-value of 94 is obtained. The softening point is 99° C. The polymer has a relatively narrow molecular weight distribution. By following the same procedure but with tricyclopentadienyl aluminum as initiator, 23 parts of a low molecular weight polystyrene is obtained having a K-value of 38.

Example 5

A mixture of 30 parts of styrene, 10 parts of vinyl acetate and 0.3 part of copper (cyclooctadiene-1,3) chloride is heated under reflux for twenty hours. The copolymer obtained is precipitated from the highly viscous solution with methanol. 32 parts of a copolymer is obtained containing 9% by weight of copolymerized vinyl acetate units. The K-value of this copolymer is 72.

Example 6

A mixture of 30 parts of acrylic acid, 100 parts of propylene, 100 parts of cyclohexane and 0.5 part of platinum (hexadiene-1,5) chloride is heated for ten hours at 100° C. 43 parts of a copolymer is obtained which contains 70% by weight of copolymerized acrylic acid units. The K-value of this copolymer is 93.

By using isobutylene as comonomer instead of propylene, 39 parts of a copolymer is obtained which contains 77% by weight of copolymerized acrylic acid units. The K-value of this copolymer is 97.

Example 7

A mixture of 100 parts of butadiene, 100 parts of dibutyl fumarate, 400 parts of benzene and 1 part of ruthenium (cyclohexadiene-1,3) benzene is heated at 100° C. in an autoclave fitted with a stirrer for a period of twelve hours. The initial pressure of 10.5 atmospheres gauge falls to 1.5 atmospheres gauge during this period.

A highly viscous solution is obtained which contains 29% by weight of the copolymer. The copolymer, whose K-value is 60, contains 57% by weight of dibutyl fumarate units. The second order transition temperature of the copolymer is −65° C.

By following the same procedure but adding 1 part of dicyclopentadienyl vanadium iodide, 65 parts of a copolymer is obtained having a K-value of 78, whose 1,4-cis fraction is 35% with reference to the copolymerized butadiene.

By following the same procedure but with a cyclooctatetraene chromium diiodide, 70 parts of a copolymer is obtained which has a K-value of 72 and a 1,4-cis fraction of 41%. The second order transition temperature is −71° C.

We claim:

1. A process for the production of polymers of ethylenically unsaturated monomeric polymerizable compounds wherein the ethylenically unsaturated monomeric compound is contacted with at least one metal π-complex selected from the group consisting of (olefin)$_m$Me, (olefin)$_m$MeX$_n$, (olefin)$_m$Mex$_n$Lo, (olefin)$_m$Me (aromatic), wherein Me is a metal selected from Group I–B of the Periodic System of Elements and

[nickel(P(C$_6$H$_5$)$_3$)$_2$]C$_2$H$_4$

X is a monovalent negatively charged radical, L is a neutral ligand, and $m$, $n$ and $o$ are simple integers.

2. A process as claimed in claim 1 wherein an additional ethylenically unsaturated monomeric polymerizable compound is used.

3. A process as claimed in claim 1 wherein the ethylenically unsaturated monomeric polymerizable compound is an α-olefin having two to ten carbon atoms and one to two olefinic double bonds.

4. A process as claimed in claim 2 wherein the ethylenically unsaturated monomeric polymerizable compound is an α-olefin having two to ten carbon atoms and one to two olefinic double bonds.

5. A process as claimed in claim 1 wherein the ethylenically unsaturated monomeric polymerizable compound is mixed with an auxiliary liquid for the polymerization.

6. A process as claimed in claim 2 wherein the ethylenically unsaturated monomeric polymerizable compound is mixed with an auxiliary liquid for the polymerization.

7. A process as in claim 1 wherein said metal π-complex is [nickel(P(C$_6$H$_5$)$_3$)$_2$]C$_2$H$_4$.

8. A process as in claim 1 wherein said metal π-complex is silver(cycloactadiene-1,5) nitrate.

9. A process as in claim 1 wherein said metal π-complex is copper (cyclooctadiene-1,3) chloride.

References Cited

UNITED STATES PATENTS 3,379,706   4/1968   Wilke _____ 260—94.3

JOSEPH L. SCHOFER, *Primary Examiner.*

JOHN KIGHT III, *Assistant Examiner.*

U.S. Cl. X.R.

252—461, 467, 472, 476; 260—82.5, 84.1, 85.5, 85.7, 86.1, 87.3, 88.1, 89.5, 93.5, 94.3, 94.9, 429, 429.3 429.5, 429.7, 429.9, 430, 431, 438, 439, 448, 665, 683.15